(12) United States Patent
Proesel et al.

(10) Patent No.: US 8,977,138 B2
(45) Date of Patent: Mar. 10, 2015

(54) OPTICAL RECEIVER USING INFINITE IMPULSE RESPONSE DECISION FEEDBACK EQUALIZATION

(75) Inventors: Jonathan E. Proesel, Yorktown Heights, NY (US); Alexander V. Rylyakov, Mount Kisco, NY (US); Clint L. Schow, Ossining, NY (US); Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/612,157

(22) Filed: Sep. 12, 2012

(65) Prior Publication Data
US 2013/0214135 A1    Aug. 22, 2013

Related U.S. Application Data

(63) Continuation of application No. 13/398,190, filed on Feb. 16, 2012.

(51) Int. Cl.
*H04B 10/00* (2013.01)

(52) U.S. Cl.
USPC .......................................... 398/208; 398/209

(58) Field of Classification Search
USPC ................................. 398/202–214
See application file for complete search history.

(56) References Cited

U.S. PATENT DOCUMENTS

| 4,494,241 A | | 1/1985 | Mayoux | |
|---|---|---|---|---|
| 4,565,974 A | * | 1/1986 | Smoot | 330/304 |
| 4,574,249 A | | 3/1986 | Williams | |
| 4,622,586 A | * | 11/1986 | Megeid | 348/532 |
| 4,751,745 A | * | 6/1988 | Price | 398/202 |
| 4,959,535 A | | 9/1990 | Garrett | |
| 5,031,194 A | * | 7/1991 | Crespo et al. | 375/233 |
| 5,117,291 A | * | 5/1992 | Fadavi-Ardekani et al. | 348/614 |
| 5,293,402 A | * | 3/1994 | Crespo et al. | 375/233 |
| 5,414,733 A | * | 5/1995 | Turner | 375/233 |
| 5,430,765 A | | 7/1995 | Nagahori | |
| 5,504,606 A | * | 4/1996 | Frigo | 398/58 |
| 5,517,527 A | * | 5/1996 | Yu | 375/233 |
| 5,600,128 A | * | 2/1997 | Lindstrom | 250/214 AG |
| 5,625,181 A | | 4/1997 | Yasuda et al. | |
| 5,864,591 A | * | 1/1999 | Holcombe | 375/345 |
| 5,903,373 A | * | 5/1999 | Welch et al. | 398/128 |
| 6,016,379 A | * | 1/2000 | Bulow | 385/147 |

(Continued)

FOREIGN PATENT DOCUMENTS

WO    2010094339 A1    8/2010

OTHER PUBLICATIONS

International Search Report; International Application Number: PCT/US2013/020729; International Filing Date: Jan. 9, 2013; Date of Mailing: May 6, 2013; 9 pages.

(Continued)

*Primary Examiner* — Agustin Bello
(74) *Attorney, Agent, or Firm* — Cantor Colburn LLP; Vazken Alexanian

(57) ABSTRACT

A technique is provided for configuring an optical receiver. A photo detector is connected to a load resistor, and the photo detector includes an internal capacitance. A current source is connected through a switching circuit to the load resistor and to the photo detector. The current source is configured to discharge the internal capacitance of the photo detector. The switching circuit is configured to connect the current source to the internal capacitance based on a previous data bit.

5 Claims, 17 Drawing Sheets

(56) References Cited

U.S. PATENT DOCUMENTS

| | | | |
|---|---|---|---|
| 6,023,357 A * | 2/2000 | Miyasita | 398/139 |
| 6,084,478 A | 7/2000 | Mayampurath | |
| 6,191,879 B1 | 2/2001 | Yanagisawa | |
| 6,437,932 B1 * | 8/2002 | Prater et al. | 360/46 |
| 6,556,330 B2 | 4/2003 | Holcombe | 398/202 |
| 6,751,255 B1 * | 6/2004 | Reuven et al. | 375/233 |
| 6,956,917 B2 | 10/2005 | Lenosky | |
| 6,999,687 B2 * | 2/2006 | Tsai | 398/202 |
| 7,023,912 B2 * | 4/2006 | Orlik et al. | 375/232 |
| 7,106,099 B1 | 9/2006 | Nix | |
| 7,177,352 B1 | 2/2007 | Plasterer et al. | |
| 7,200,180 B2 * | 4/2007 | Verbin et al. | 375/261 |
| 7,288,754 B2 | 10/2007 | Tsai | |
| 7,324,589 B2 * | 1/2008 | Hidaka | 375/232 |
| 7,346,105 B2 | 3/2008 | Endres et al. | |
| 7,406,269 B2 | 7/2008 | Becker et al. | |
| 7,418,213 B2 * | 8/2008 | Denoyer | 398/210 |
| 7,570,109 B2 * | 8/2009 | Xu et al. | 329/347 |
| 7,643,755 B2 * | 1/2010 | Rafferty et al. | 398/131 |
| 7,652,240 B2 | 1/2010 | Childs | |
| 7,936,840 B2 * | 5/2011 | Agazzi et al. | 375/285 |
| 8,101,902 B2 * | 1/2012 | Baumann | 250/221 |
| 8,139,628 B1 | 3/2012 | Altekar | 375/229 |
| 8,238,761 B2 * | 8/2012 | Liu et al. | 398/209 |
| 8,406,351 B1 | 3/2013 | Altekar | 375/341 |
| 8,548,089 B2 * | 10/2013 | Agazzi et al. | 375/285 |
| 8,582,985 B2 | 11/2013 | Liu et al. | |
| 8,626,002 B2 | 1/2014 | Kucharski | |
| 2001/0036334 A1 * | 11/2001 | Choa | 385/27 |
| 2001/0040922 A1 * | 11/2001 | Buchali et al. | 375/233 |
| 2004/0032904 A1 * | 2/2004 | Orlik et al. | 375/233 |
| 2004/0136731 A1 * | 7/2004 | Wang et al. | 398/208 |
| 2005/0047802 A1 * | 3/2005 | Jaynes et al. | 398/208 |
| 2005/0095013 A1 * | 5/2005 | Tsai | 398/209 |
| 2005/0175359 A1 * | 8/2005 | Tsai | 398/202 |
| 2005/0191062 A1 * | 9/2005 | Rafferty et al. | 398/202 |
| 2006/0127100 A1 * | 6/2006 | Frankel et al. | 398/158 |
| 2007/0071455 A1 | 3/2007 | Margalit et al. | |
| 2007/0286611 A1 | 12/2007 | Weber et al. | |
| 2010/0202506 A1 * | 8/2010 | Bulzacchelli et al. | 375/233 |
| 2011/0186715 A1 | 8/2011 | Fattal et al. | |
| 2011/0299856 A1 | 12/2011 | Koo et al. | |
| 2012/0141122 A1 * | 6/2012 | Carusone et al. | 398/37 |
| 2012/0224868 A1 * | 9/2012 | Proesel et al. | 398/208 |
| 2012/0315052 A1 | 12/2012 | Liu et al. | |
| 2013/0108280 A1 * | 5/2013 | Azadeh et al. | 398/210 |
| 2013/0214135 A1 * | 8/2013 | Proesel et al. | 250/214.1 |
| 2013/0216241 A1 * | 8/2013 | Proesel et al. | 398/213 |
| 2013/0229236 A1 * | 9/2013 | Poesel et al. | 330/308 |
| 2013/0287089 A1 | 10/2013 | Bulzacchelli et al. | |
| 2013/0294546 A1 | 11/2013 | Emami-Neyestanak et al. | |
| 2014/0064351 A1 * | 3/2014 | Hidaka | 375/232 |

OTHER PUBLICATIONS

Written Opinion; International Application No. PCT/US2013/020729; Filing date: Jan. 9, 2013; 5 pages; Priority date: Feb. 16, 2012; Date of Mailing: May 6, 2013.

M. Hagman, et al., "Two Enhanced Decision Feedback Equalizers for 10Gb/s Optical Communications," 1st Microsystems and Nanoelectronics Research Conference, MNRC 2008, Oct. 15, 2008. pp. 125-128.

S. Kasturia, et al., "Techniques for High-Speed Implementation of Nonliner Cancellation," IEEE Journal on Selected Areas in Communications, vol. 9, Issue 5, Jun. 1991, pp. 711-717.

B. Kim, et al., "A 10-Gb/s Compact Low-Power Serial I/O with DFE-IIR Equalization in 65-nm CMOS," IEEE Journal of Solid-State Circuits, vol. 44, Issue 12, Dec. 2009, pp. 3526-3538.

K. Roberts, "Electronic Dispersion Compensation Beyond 10 Gb/s," Digest of the IEEE/LEOS Summer Topical Meetings, Jul. 23-25, 2007, pp. 9-10.

* cited by examiner

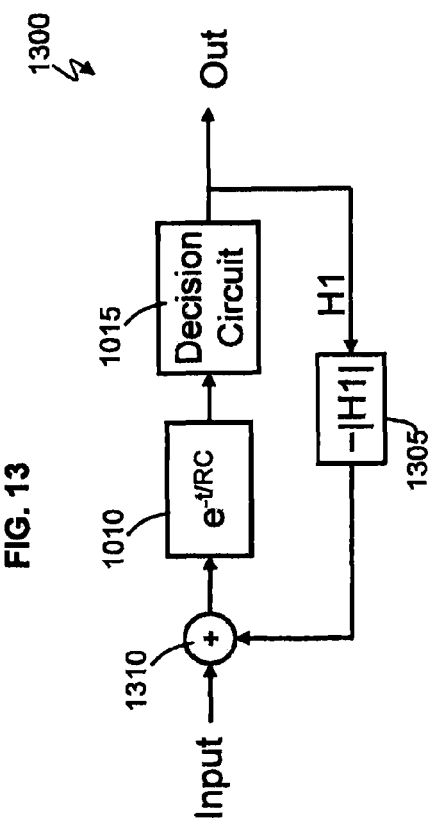
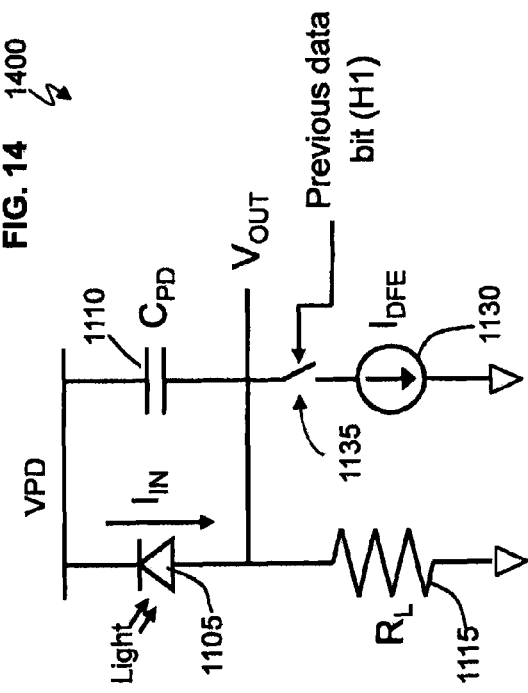

Generate a current by a photo detector connected to a load resistor, the photo detector comprising an internal capacitance  2105

↓

Connect, by the switching circuit, the current source to the internal capacitance based on a previous data bit  2110

↓

Discharge, by the current source, the current on the internal capacitance based on the switching circuit connecting the current source to the internal capacitance  2115

OPTICAL RECEIVER USING INFINITE IMPULSE RESPONSE DECISION FEEDBACK EQUALIZATION

CROSS-REFERENCE TO RELATED APPLICATIONS AND PRIORITY CLAIM

This application is a continuation of U.S. Non-Provisional application Ser. No. 13/398,190, entitled "OPTICAL RECEIVER USING INFINITE IMPULSE RESPONSE DECISION FEEDBACK EQUALIZATION", filed Feb. 16, 2012, which is incorporated herein by reference in its entirety.

BACKGROUND

Exemplary embodiments relate to optical communications, and more specifically to, optical receivers with infinite impulse response decision feedback equalization.

Optical communication is any form of telecommunication that uses light as the transmission medium. An optical communication system consists of a transmitter, which encodes a message into an optical signal, a channel, which carries the signal to its destination, and a receiver, which reproduces the message from the received optical signal.

BRIEF SUMMARY

According to an exemplary embodiment, a method is provided for configuring an optical receiver. The method includes generating a current by a photo detector connected to a load resistor, and the photo detector includes an internal capacitance. A current source is connected through a switching circuit to the load resistor and to the photo detector. The method includes connecting, by the switching circuit, the current source to the internal capacitance based on a previous data bit, and discharging, by the current source, the current on the internal capacitance based on the switching circuit connecting the current source to the internal capacitance.

According to an exemplary embodiment, a method for an optical receiver is provided. The method includes generating a voltage by a photo detector connected to a load resistor; and making a decision by a decision circuit based on the voltage. The voltage is received at an input to the decision circuit. The method includes generating by an infinite impulse response filter a filter output based on the decision from the decision circuit, in which the filter output of the infinite impulse response filter matches a decaying exponential tail of the voltage, and subtracting the filter output from the voltage at the input to the decision circuit to remove the decaying exponential tail of the voltage.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 13 is a system-level diagram of an optical receiver with a merged IIR filter and the RC front-end according to an exemplary embodiment.

FIG. 14 is a circuit diagram of an optical receiver according to an exemplary embodiment.

FIG. 21 is a method of configuring an optical receiver according to an exemplary embodiment.

DETAILED DESCRIPTION

Figure 1:
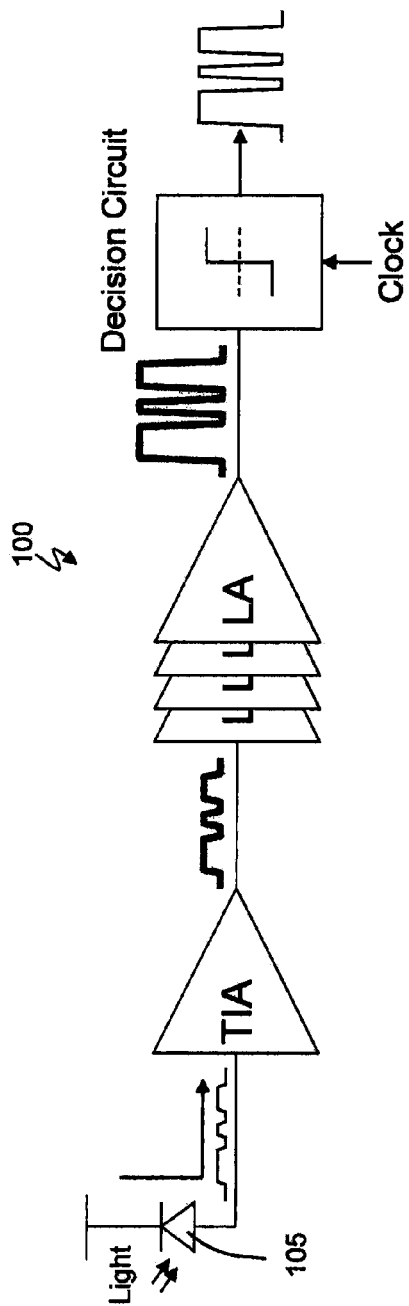
FIG. 1 is a block diagram of an optical receiver.

Optical communications receivers begin with a photo detector 105 that converts modulated input light into a similarly-modulated current in FIG. 1. FIG. 1 shows a block diagram of an optical receiver 100.

Typical values of the current are in the range of tens of microamperes, but can be smaller or larger, depending on the application. In order to be useful for the digital processing on the receiving side, this current has to be converted into voltage domain and amplified. This current is fed into a transimpedance amplifier (TIA), which converts the current into a voltage signal. This voltage is then amplified by a limiting amplifier (LA). The amplified voltage is delivered to a decision circuit, which samples (slices) the input voltage signal and outputs the associated digital data.

Figure 2:
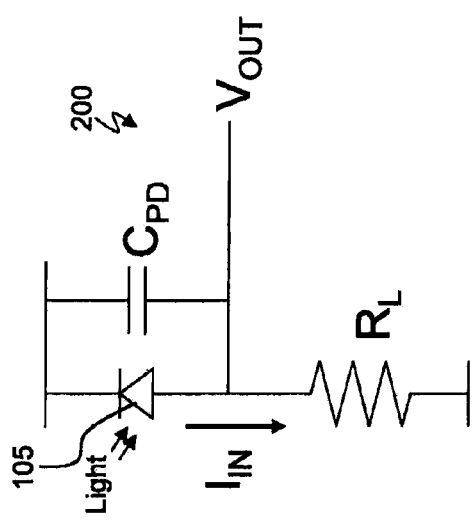
FIG. 2 is a block diagram of a resistor capacitor (RC) front-end that may be utilized for an optical receiver.

FIG. 2 illustrates a block diagram 200 of a resistor capacitor (RC) front-end that may be utilized for the optical receiver 100. The resistor $R_L$ acts as a current to voltage converter. The capacitor $C_{PD}$ is (represents) an internal capacitance of the photodiode and is connected in parallel with the photodiode 105. $C_{PD}$ may also be considered to include other capacitances connected in parallel with the photodiode, such as the capacitance of electrical connections to the photo detector (wirebond pad, etc), the input capacitance of the TIA, and other parasitic capacitances.

The design of the TIA/LA chain involves a number of classical tradeoffs between gain, bandwidth, and noise. To illustrate these tradeoffs, first consider the example of the simplest transimpedance converter which is the load resistor $R_L$, as shown in FIG. 2. The transimpedance gain of the resistor $R_L$ is given by the following equation:

$$V_{OUT}/I_{IN}=R_L.$$

Clearly, higher values of $R_L$ will result in higher gain (i.e., higher $V_{OUT}$). The bandwidth (BW) of the resistor based optical receiver shown in FIG. 2 is determined by the RC filter, formed by the resistor $R_L$ and photodiode (or, more generally, photo detector) capacitance $C_{PD}$:

$$BW=1/(2\pi \cdot R_L \cdot C_{PD}).$$

In order to achieve the highest possible data rate, the bandwidth (BW) has to be as high as possible. One way to increase the bandwidth is to reduce the photodiode capacitance $C_{PD}$. This is often limited by the size of available photo detectors, electrical connections to the photo detector (wirebond pad, etc), the input capacitance of the TIA, and other parasitic capacitances. In the silicon photonics scenario, $C_{PD}$ is greatly reduced, due to 1) very small size of the integrated detector and 2) absence of the wirebond pad. There still would remain a small finite value of the order of several fF (femto-farads), due to on-chip parasitics. In this work, $C_{PD}$ was considered to be fixed. The only way to increase the bandwidth then is to reduce $R_L$.

Note, however, that as described above, reducing $R_L$ will result in reduced gain. Another key parameter of TIA performance is the total integrated input referred current noise ($|I_{n,in}^2|$), given by the following equation:

$$|I_{n,in}^2|=(kT/R_L^2 C_{PD}),$$

where k is Boltzmann's constant and T is temperature.

At a given temperature (T) and $C_{PD}$, the only way to improve the input referred noise ($|I_{n,in}^2|$) is to increase $R_L$. A closer inspection of the noise performance from the perspective of the output voltage illustrates the fundamental relationship between transimpedance gain and signal-to-noise ratio. The total integrated output voltage noise ($|V_{n,out}^2|$) of an RC filter does not depend on the resistor value (of $R_L$), as illustrated by the following equation:

$$|V_{n,out}^2|=(kT/C_{PD}).$$

The output voltage is: $V_{OUT}=R_L I_{IN}$.

Resulting in the following equation for signal-to-noise ratio (SNR):

$$SNR=R_L I_{IN}/(\sqrt{kT/C_{PD}}).$$

From the perspective of the output voltage ($V_{OUT}$), the SNR improves only as a result of the increase in transimpedance gain; the output voltage noise remains constant. The optical receiver's sensitivity is dictated by the SNR, and maximizing the SNR will maximize the sensitivity.

However, the previous analysis assumes that all the input current $I_{IN}$ is carried by $R_L$, realizing the maximum voltage drop possible across $R_L$. This is not the case when $R_L \cdot C_{PD}$ is on the order of a single bit period, also known as the unit interval (UI). For large values of $R_L$, current is diverted across $C_{PD}$, charging the capacitor instead of creating voltage drop across the resistor $R_L$. The unit interval is the minimum time interval between condition changes of a data transmission signal, also known as the pulse time, symbol duration time, and bit time. For example, the unit interval (UI) is the time taken in a data stream by each subsequent pulse, symbol, or bit.

Figure 3:
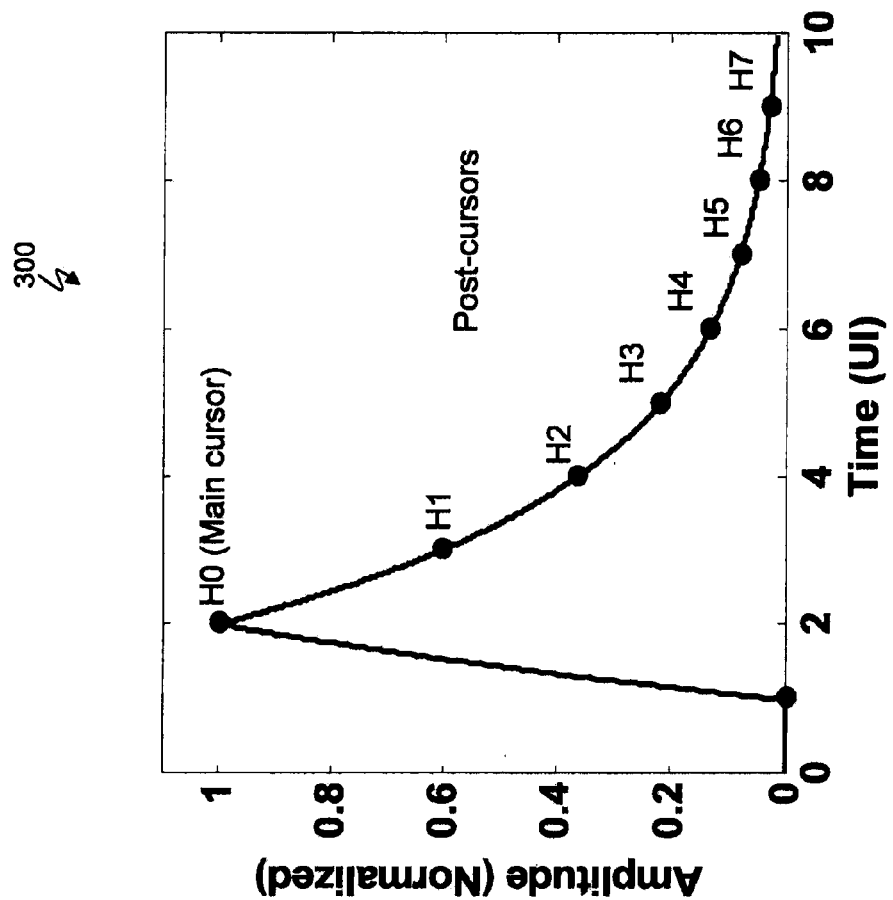
FIG. 3 is a graph of the pulse response of an RC low-pass filter.

FIG. 3 is a graph 300 illustrating the pulse response of an RC low-pass filter. The main cursor, H0, represents the single (bit) '1' sent into the RC low-pass filter of resistor $R_L$ and capacitor $C_{PD}$ in FIG. 2. The post-cursors, H1 to H7, are the result of the '1' being smeared out by the low bandwidth of the RC filter.

The magnitude of the main cursor, H0, determines the main cursor gain that can be realized over 1 UI. The equation for the magnitude of the main cursor is:

$$V_{H0}=I_{IN} \cdot R_L \cdot (1-e^{-UI/R_L \cdot C_{PD}}).$$

The main cursor gain that can be realized over 1 UI can then be expressed as:

$$\text{Main Cursor Gain}=V_{H0}/I_{IN}=R_L \cdot (1-e^{-UI/R_L \cdot C_{PD}}).$$

The maximum main cursor gain achievable by increasing $R_L$ is not infinite, but is instead given by the following formula:

$$\lim_{(R_L \to \infty)} \text{Main Cursor Gain}=UI/C_{PD}.$$

The maximum main cursor gain occurs when $R_L$ is effectively an open circuit and all current is integrated on $C_{PD}$ for a period of 1 UI.

Figure 4:
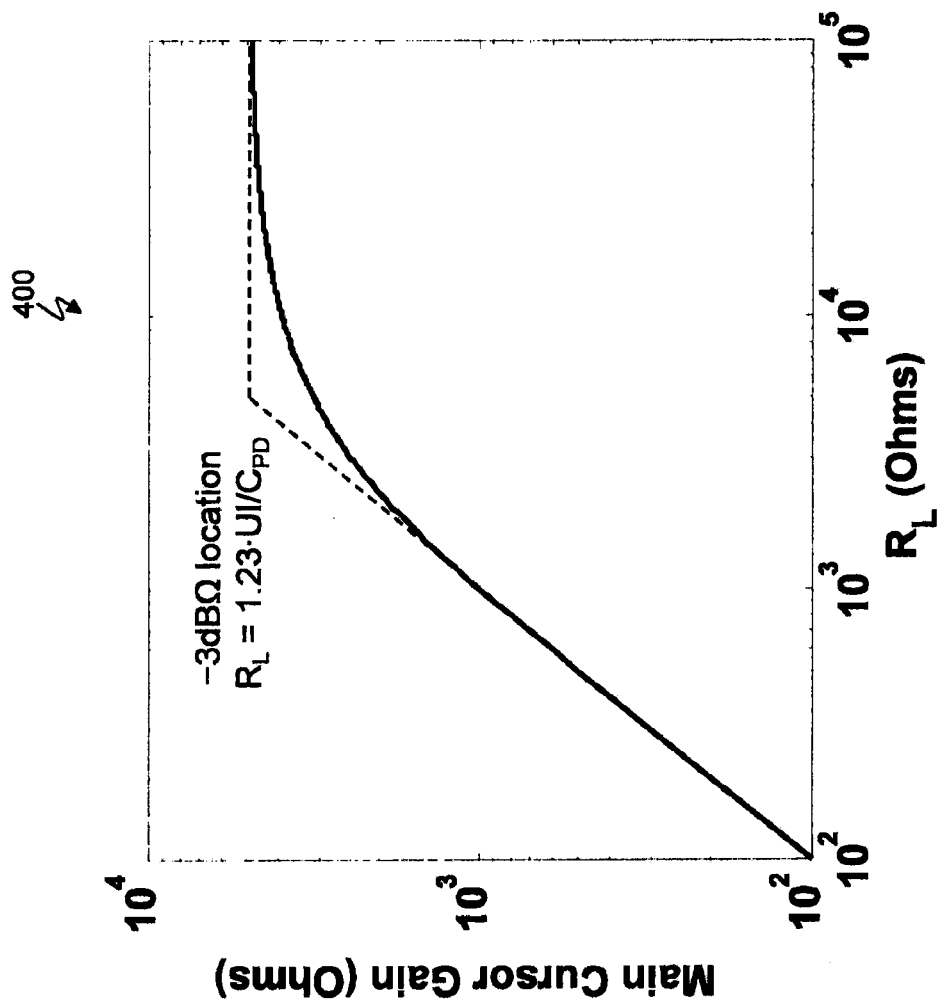
FIG. 4 is a graph of main cursor gain versus changing load resistance for example values of load resistance, photodiode capacitance, and unit interval.

FIG. 4 is a graph 400 that shows the main cursor gain versus $R_L$ using example values of UI=100 ps (picoseconds) and $C_{PD}$=20 fF. The maximum main cursor gain linearly tracks the value of $R_L$ for small values of $R_L$ (where $R_L \cdot C_{PD}$ is much less than 1 UI) but begins to level off and asymptotically approach UI/$C_{PD}$=5 kΩ for large values of $R_L$ (where $R_L \cdot C_{PD}$ is equal to or greater than 1 UI).

Figure 5:
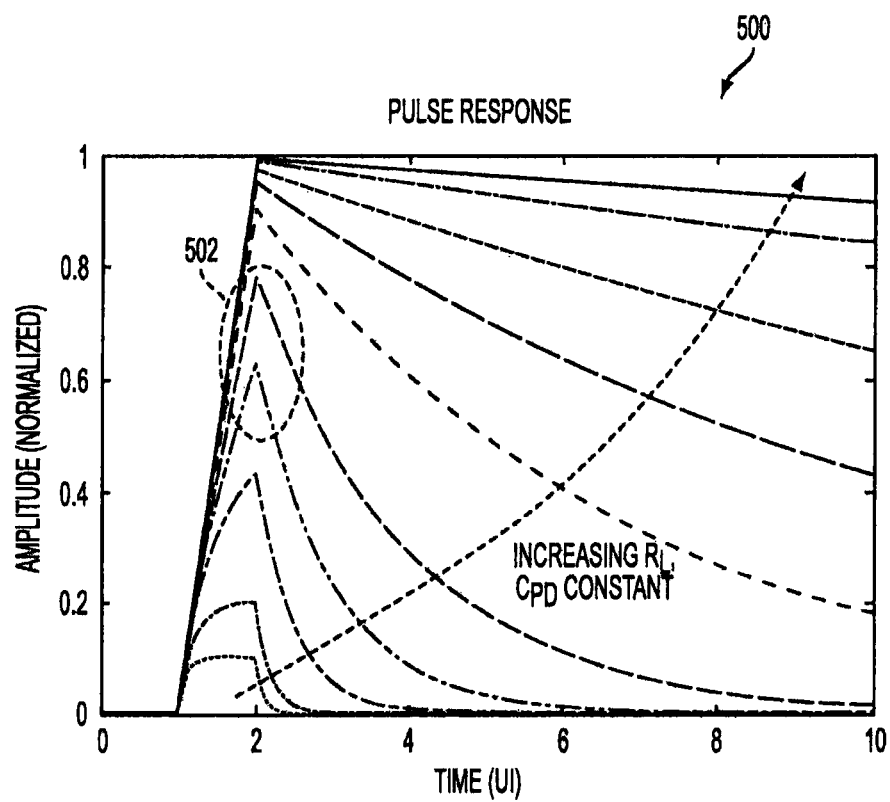
FIG. 5 is a graph of the pulse response while the load resistance is increased.

FIG. 5 is a graph 500 that shows the pulse response of the circuit of FIG. 2 as $R_L$ is increased while holding $C_{PD}$ constant. The shape of the pulse response demonstrates the key drawback with increasing $R_L$ to achieve greater and greater gain is that the tail (i.e., the post-cursors) of the pulse becomes longer and longer, creating an increasing amount of intersymbol interference (ISI). The length of the tail is a result of the decreasing bandwidth of the RC filter as $R_L$ increases. Intersymbol interference (ISI) is a form of distortion of a signal in which one symbol interferes with subsequent symbols, and this is an unwanted phenomenon as the previous symbols have the similar effect as noise, thus making the communication less reliable.

Figure 6:
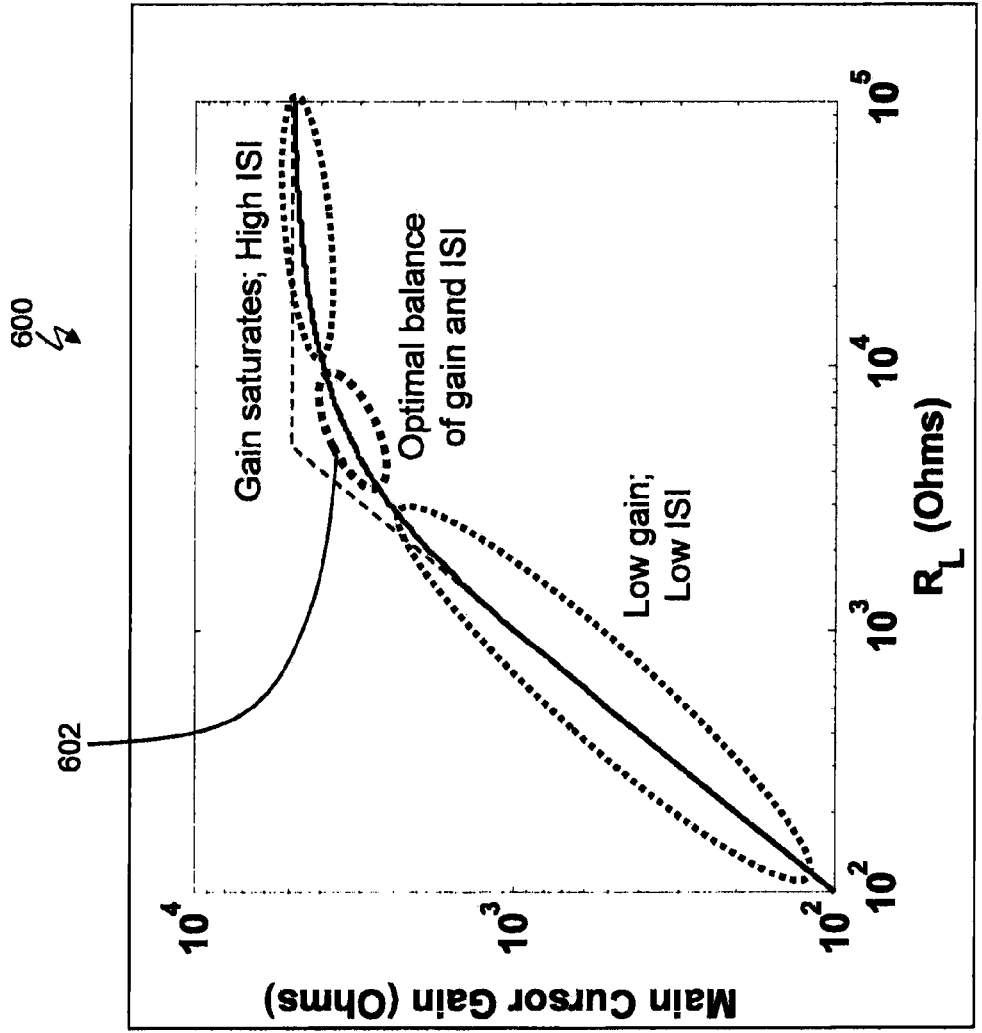
FIG. 6 is a graph showing three different regions of main cursor gain versus increased load resistance.

FIG. 6 is a graph 600 that shows the three different regions of the main cursor gain versus the $R_L$ curve shown in FIG. 4. In FIG. 6, low gain and low ISI is shown on the left. High gain and medium ISI is shown in the center region 602. Saturated gain and high ISI is shown on the right. The center region 602 of high gain and medium ISI is the optimum region for balancing main cursor gain and ISI, and this center region 602 corresponds to region 502 in FIG. 5.

Figure 7:
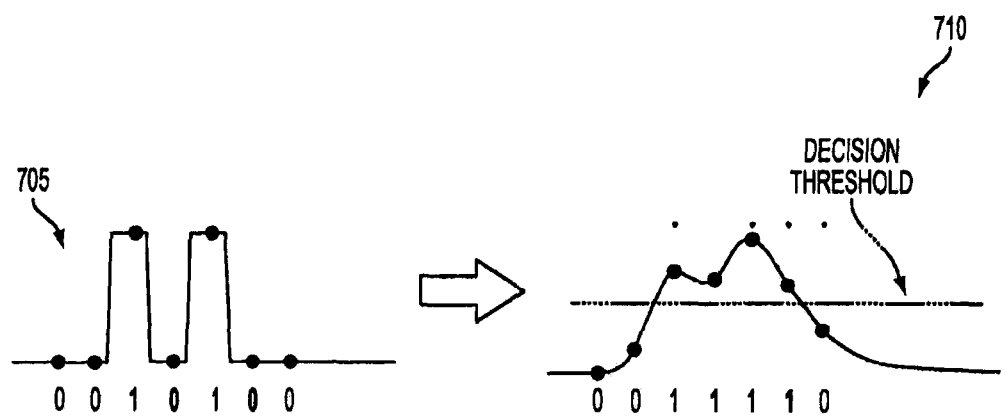
FIG. 7 illustrates the effect of intersymbol interference on a digital data stream.

The ISI in digital data resulting from bandwidth limitations in the system is a very well known effect. FIG. 7 demonstrates the effect of ISI on a digital data stream. In FIG. 7, graph 705 shows the initial set of pulses transmitted to and received by the photo detector, and graph 710 shows the output with ISI received by the decision circuit. The ISI creates errors in the data stream of the graph 710 when the decision threshold is held constant. In traditional optical receivers, the ISI must be minimized in order to accurately distinguish digital 0s from 1s. This requires that the impulse response be minimally distorted and the associated bandwidth (BW) be large, resulting in a small value for $R_L$ and a substantial amount of the available main cursor gain is not achieved.

As seen in graph 710, FIG. 7 shows that intersymbol interference (ISI) in a digital data stream can result in errors when the decision threshold is constant (independent of data history). By canceling the ISI, it is possible to accurately recover all the digital bits (i.e., 1s and 0s) from a bandwidth-limited digital data stream as discussed herein.

Figure 8:
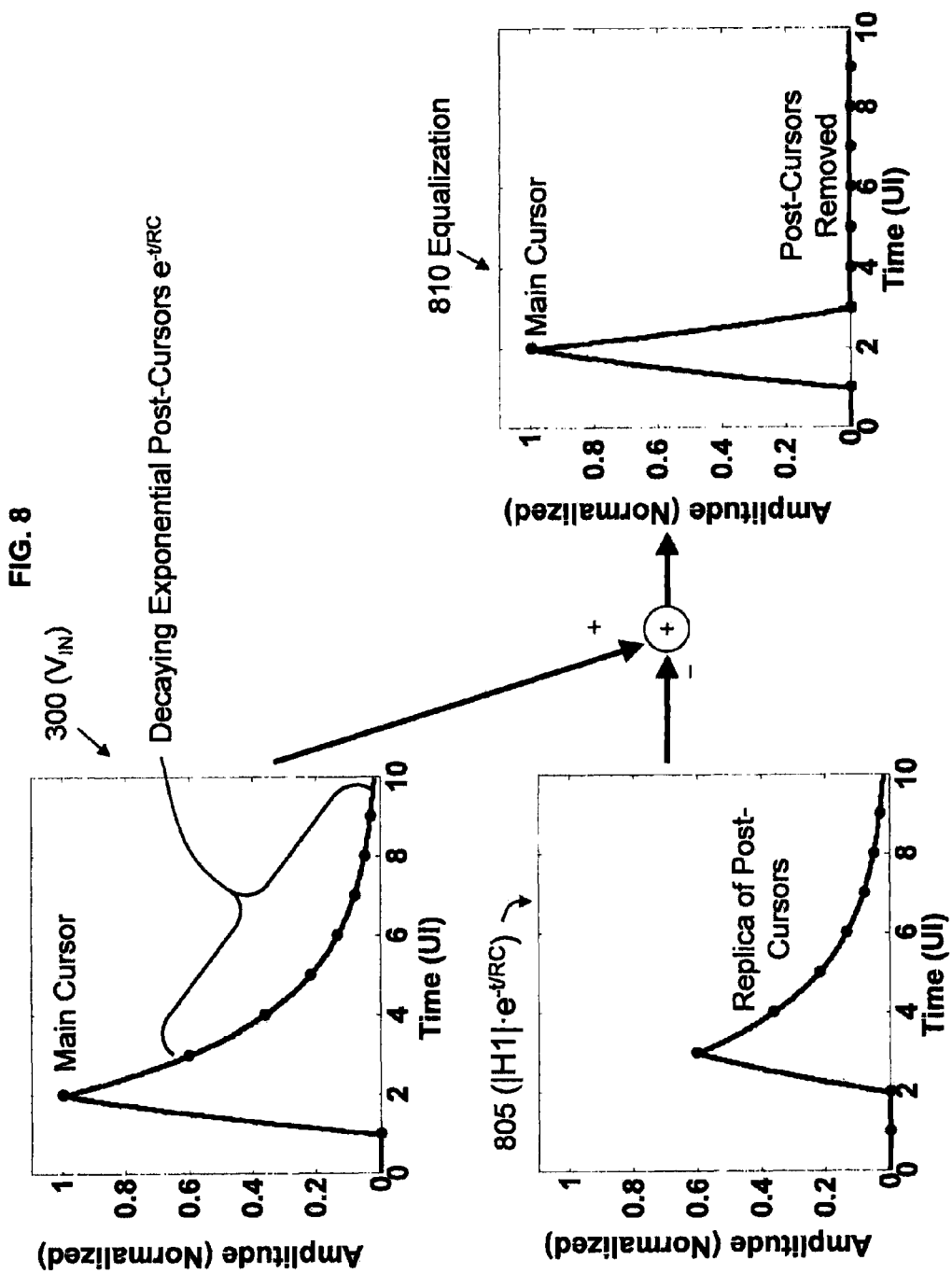
FIG. 8 illustrates subtracting away the decaying exponential tail (post-cursors) to achieve cancellation of intersymbol interference.

As discussed further in an exemplary embodiment, FIG. 8 illustrates subtracting away the decaying exponential tail (post-cursors) to achieve perfect cancellation of the ISI. In FIG. 8, graph 300 from FIG. 3 shows the main cursor and the decaying exponential post-cursors $e^{-t/RC}$ (i.e., the tail). Graph 805 shows a replica of the post-cursors (the tail) and is subtracted from graph 300 to result in graph 810. ISI created by post-cursors can be removed by a decision feedback equalizer (DFE). The DFE moves the decision threshold dynamically based on the previous data history, effectively subtracting the ISI from the data stream. Because decision feedback equalization uses noiseless digital decisions, it adds no noise during the equalization process, allowing the optical receiver to achieve the best possible sensitivity. General information is described in U.S. patent application Ser. No. 13/039,026, entitled "Optical Receiver Based On A Decision Feedback Equalizer", filed on Mar. 2, 2011, which is herein incorporated by reference.

A single pole RC filter has a tail in its impulse response which is mathematically described as a decaying exponential:

$$V_{tail} = V_{H0} \cdot e^{-t/RC}.$$

Figure 9:
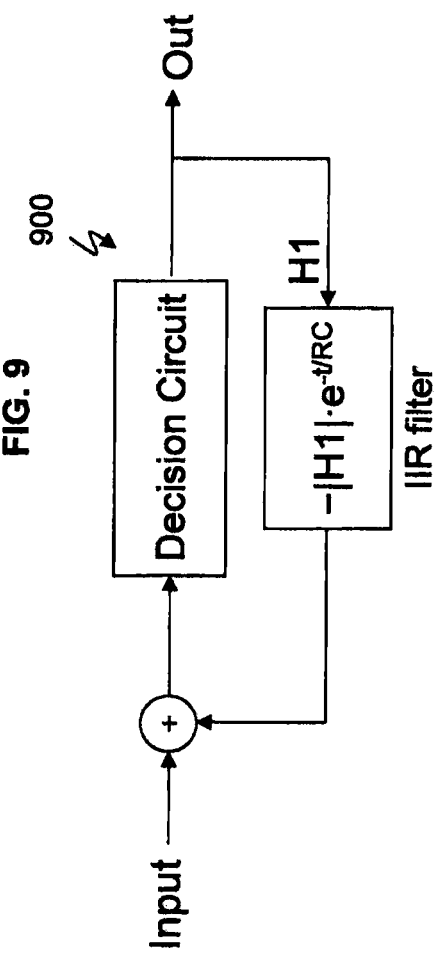
FIG. 9 is a system-level diagram of a decision feedback equalizer (DFE) using an infinite impulse response (IIR) filter for feedback.

By subtracting away this exponential tail, it is possible to eliminate all the ISI contained in the tail as illustrated in FIG. 8. The subtraction of the tail can be achieved using the decision feedback equalizer shown in FIG. 9. FIG. 9 illustrates a system-level diagram 900 of a decision feedback equalizer (DFE) using an infinite impulse response (IIR) filter for feedback. The digital decision made by the decision circuit is filtered by an IIR filter which matches the decaying exponential tail. The IIR filter output is then subtracted from the input, removing the post-cursor ISI. The system-level diagram shows that input (In)−|H1|·$e^{-t/RC}$=Out.

Further information regarding decision feedback equalization can be found in U.S. Patent Publication 2010/0202506, J. Bulzacchelli and B. Kim, entitled "Circuits and methods for DFE with reduced area and power consumption" and in B. Kim et al., "A 10-Gb/s compact low-power serial I/O with DFE-IIR equalization in 65-nm CMOS", IEEE J. Solid-State Circuits, December 2009, both of which are herein incorporated by reference.

Figure 10:
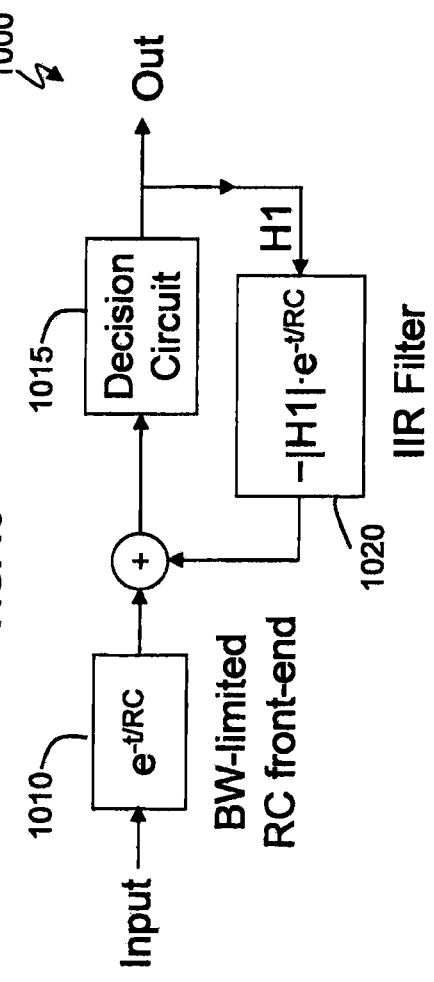
FIG. 10 is a system-level diagram of an optical receiver using an infinite impulse response (IIR) decision feedback equalizer (DFE) according to an exemplary embodiment.

FIG. 10 is a system-level diagram 1000 of an optical receiver using an infinite impulse response (IIR) decision feedback equalizer (DFE) according to an exemplary embodiment. The optical receiver of the system-level diagram 1000 includes a resistor capacitor (RC) front end 1010, a decision circuit 1015, and an infinite impulse response filter (circuit) 1020. It is proposed that the DFE-IIR technique be applied to optical receivers, where the 'channel' to be equalized is instead the RC low-pass filter created by the photo detector/photodiode capacitance ($C_{PD}$) and load resistor ($R_L$). In this way, a large resistance for the load resistor $R_L$ can be utilized to obtain most of the available main cursor gain while noiselessly eliminating the resulting ISI with the DFE. This provides the best possible SNR sensitivity for the optical receiver. In addition, as more gain is realized in the initial current to voltage (I-to-V) conversion, the number of limiting amplifier stages can be reduced, resulting in lower power consumption.

Figure 11:
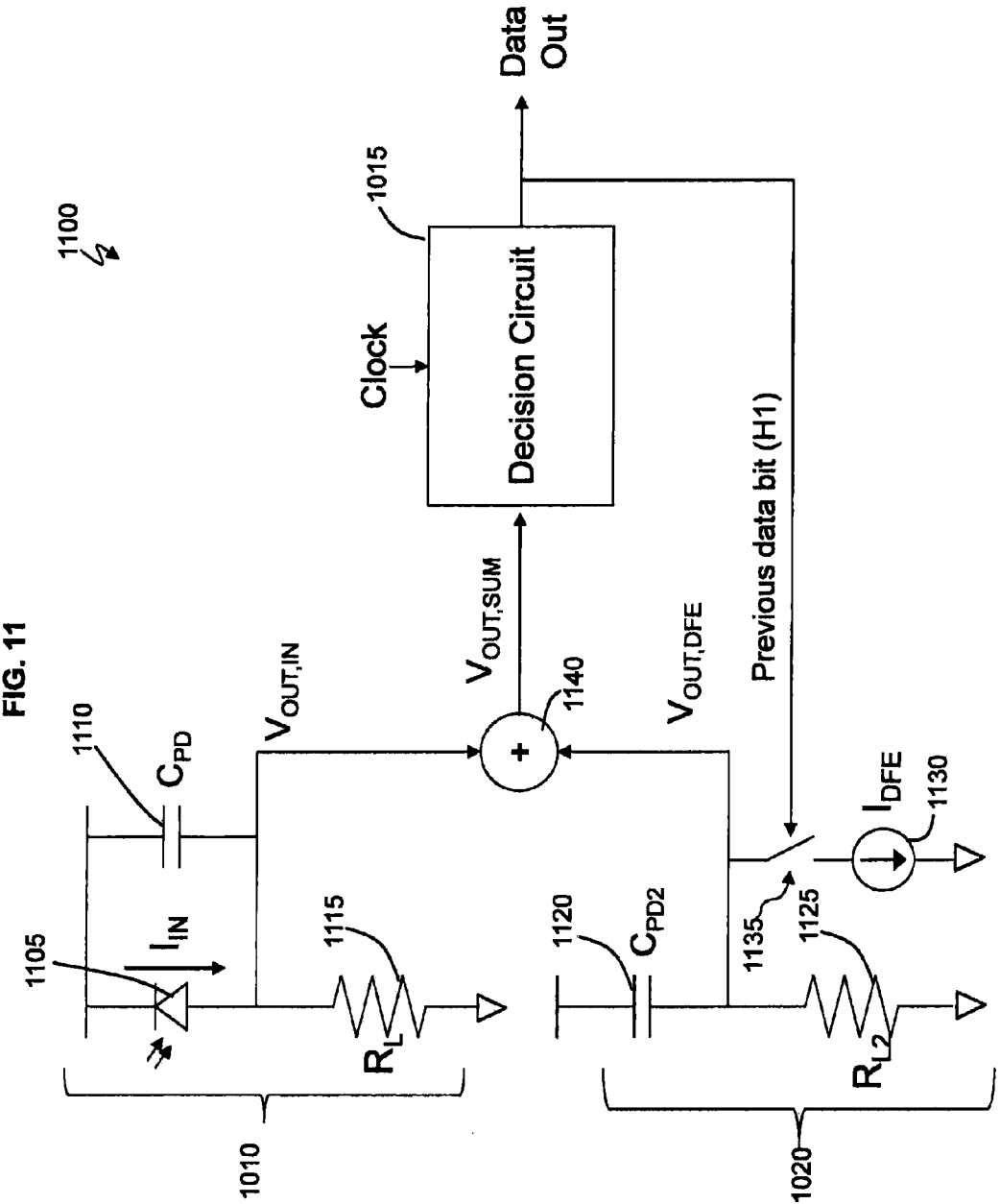
FIG. 11 is a circuit diagram of an optical receiver with a separate RC front-end and IIR filter according to an exemplary embodiment

FIG. 11 shows a circuit diagram 1100 of the separate RC front-end and IIR filter of FIG. 10 according to an exemplary embodiment. FIG. 11 shows an example of the optical receiver of FIG. 10 with separate input RC front-end ($I_{IN}$, $R_L$, and $C_{PD}$) and IIR filter ($I_{DFE}$, $R_{L2}$, and $C_{PD2}$).

The RC front-end 1010 is formed by photo detector 1105, the photo detector capacitance $C_{PD}$ of capacitor 1110, and the load resistor $R_L$ 1115. The capacitor 1110 is internal to the photo detector 1105 but the internal photo detector capacitance $C_{PD}$ of capacitor 1110 is separately represented in the RC front-end 1010. The decision circuit 1015 may be a latch circuit. The IIR filter 1020 is formed by the capacitance $C_{PD2}$ of capacitor 1120 and load resistor $R_{L2}$ 1125, where $C_{CPD2}$ and $R_{L2}$ are chosen such that $C_{PD} \cdot R_L = C_{PD2} \cdot R_{L2}$. The IIR filter 1020 also includes a negative current source 1130 and a switch 1135. The input current from the photo detector 1105 is $I_{IN}$. The current $I_{DFE}$ of the current source 1130 is switched on and off (via the switch 1135) based on the last received bit in the decision circuit 1015, thus providing the feedback path. Also, FIG. 11 includes a summer 1140 which can be a summing circuit.

Figure 12:
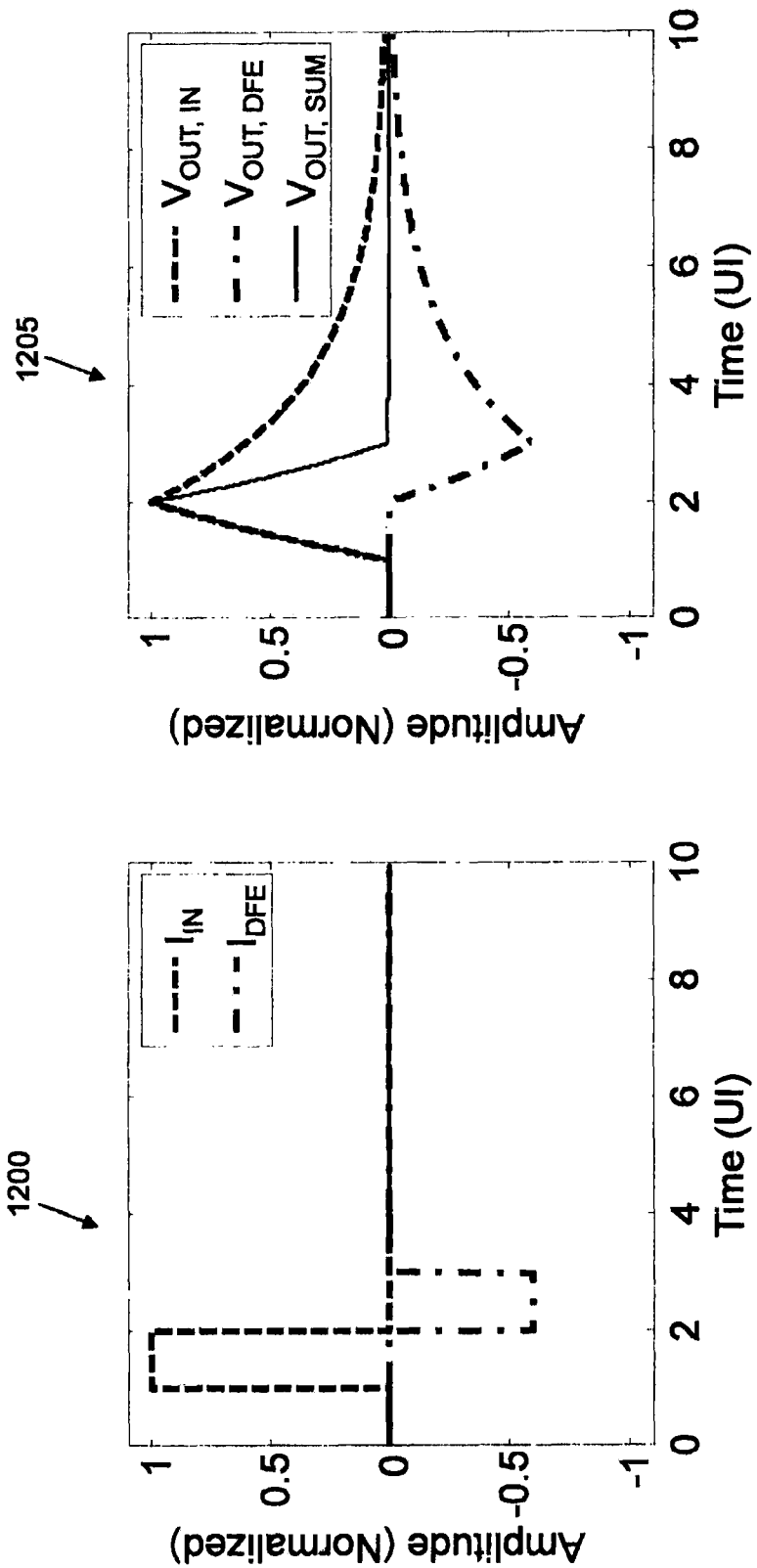
FIG. 12 is a graph of the input current from a photo detector and the current from a current source, along with the resulting output voltage waveforms according to an exemplary embodiment.

FIG. 12 shows the input current $I_{IN}$ from the photo detector 1105 and the current $I_{DFE}$ from the current source 1130 in graph 1200, along with the resulting output voltage waveforms in graph 1205. The current $I_{IN}$ creates the output voltage $V_{OUT,IN}$ in graph 1205 while the current $I_{DFE}$ creates the output voltage $V_{OUT,DFE}$ in graph 1205. Summing the output voltage $V_{OUT,IN}$ with the output voltage $V_{OUT,DFE}$ results in the final, ISI-free waveform voltage sum $V_{OUT,SUM}$ shown in the graph 1205.

According to an exemplary embodiment, there is no need for the RC front-end 1010 and the IIR filter 1020 to remain separate. The same load resistor and photo detector capacitance can be used for both functions, resulting in the system diagram of FIG. 13. FIG. 13 illustrates a system-level diagram 1300 of an optical receiver with a merged IIR filter and the RC front-end. In FIG. 13, the optical receiver includes resistor capacitor (RC) front end 1010, the decision circuit 1015, summer 1310, and feedback gain 1305. The RC front end 1010 incorporates the function of the time constant $e^{-t/RC}$ that was previously in IIR filter 1020. As will be seen in FIG. 14, the replica with capacitance $C_{PD2}$ of capacitor 1120 and load resistor $R_{L2}$ 1125 is no longer needed.

FIG. 14 shows the circuit diagram of the optical receiver 1400 according to an exemplary embodiment. In FIG. 14, the optical receiver 1400 includes the photo detector 1105 which generates the current $I_{IN}$, the capacitance $C_{PD}$ of capacitor 1110, the load resistor $R_L$ 1115, and the (negative) current source 1130, without utilizing the replica. By reusing the same RC (i.e., the same load resistor $R_L$ 1115 and capacitance $C_{PD}$ of capacitor 1110 forming the time constant $e^{-t/RC}$) for the IIR filter 1020, all time constants in the circuit of the optical receiver 1400 are perfectly matched and only the amplitude of the feedback (in the feedback gain 1305) needs to be adjusted to achieve ISI cancellation. Accordingly, the circuit diagram of the optical receiver 1400 (corresponding to the system-level diagram 1300) illustrates reuse of the input RC front-end to provide IIR decision feedback equalization. Also, VPD can represent a positive voltage, such e.g., 5 volts, applied across the photo detector 1105.

Figure 15:
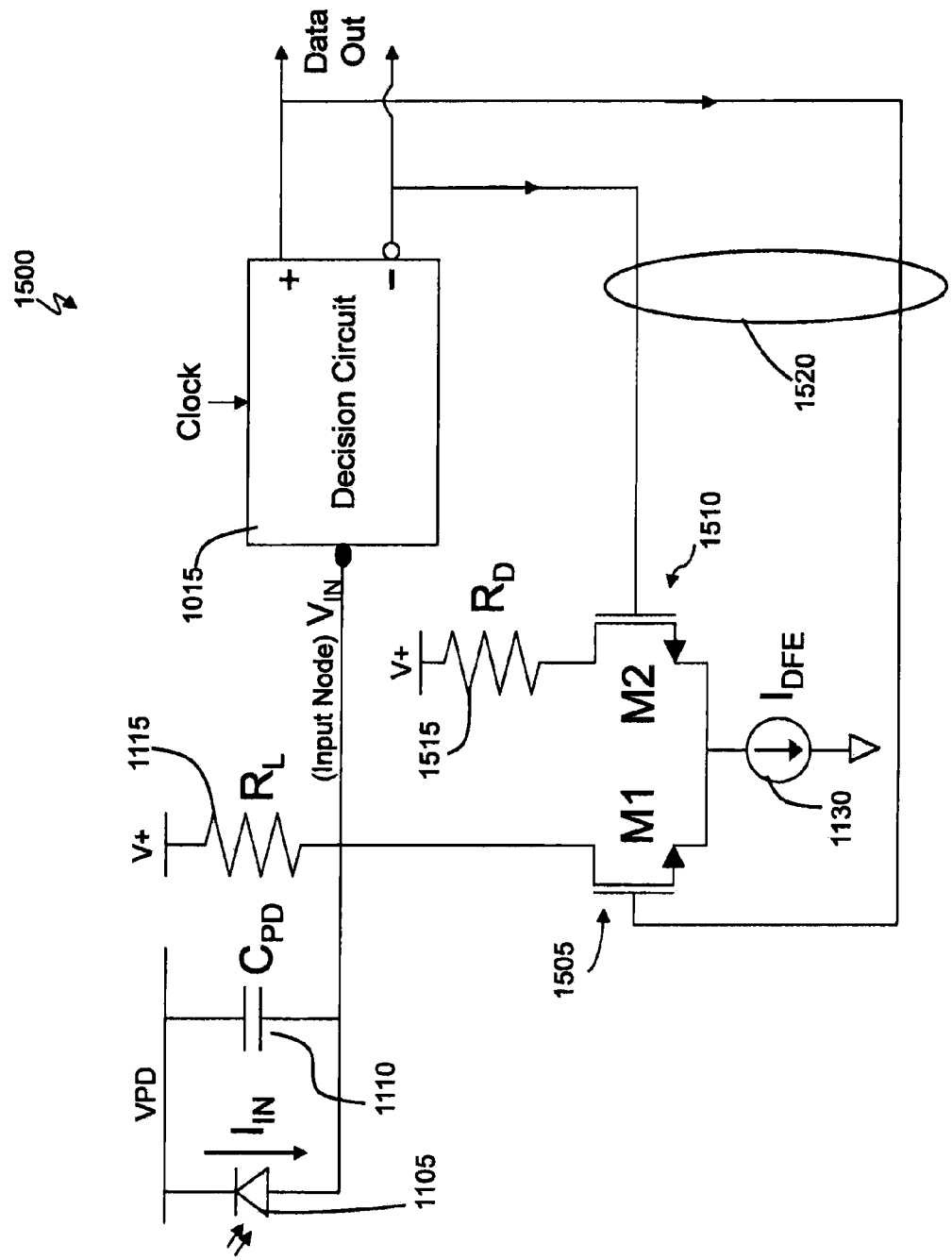
FIG. 15 is an optical receiver according to an exemplary embodiment.

There are many ways to implement the teachings disclosed herein. FIG. 15 shows one possible implementation of an optical receiver 1500 according to an exemplary embodiment. The optical receiver 1500 is an example of a low-power full-rate receiver architecture. The RC front-end includes the capacitance $C_{PD}$ of capacitor 1110 and the load resistor $R_L$ 1115. The decision circuit 1015 has its input connected to input voltage ($V_{IN}$) at an input node. The positive output side of the decision circuit 1015 is connected to the gate of (MOSFET) M1 transistor 1505 while the negative output side is connected to the gate M2 transistor 1510. The drain of transistor 1510 is connected to a dummy load resistor $R_D$ 1515, and the drain of transistor 1505 is connected to the input voltage ($V_{IN}$) at the input node. The current source $I_{DFE}$ 1130 is switched between the input node (connected to the input voltage $V_{IN}$) and the dummy load resistor $R_D$ by the differential pair M1-M2. The dummy load resistor $R_D$ 1515 provides a sink for the current $I_{DFE}$ so that the current source 1130 remains in saturation, minimizing the effects of switching on the feedback current. One side of resistors $R_L$ and $R_D$ is connected to voltage V+, representing some positive voltage, e.g., 1.2V. The decision feedback equalizer (DFE) consists of the decision circuit 1015 and the feedback path 1520 through the differential pair of transistors 1505 and 1510. The decision circuit 1015 receives a timing signal from a clock that tells the latch when to make a decision. For each tick (signal) of the clock, the decision circuit 1015 makes a decision for the differential output on the positive output side and the negative output side based on the received input voltage $V_{IN}$. The implementation of the current steering circuit comprised of transistors 1505 and 1510 (and all other circuits) is not limited to MOSFETs but can also be realized using any other technology, including bipolar transistors, JFETs (junction gate field-effect transistors), HEMTs (high electron mobility transistors), etc.

When the output on the (+ plus) positive output side of the decision circuit 1015 is high (and the negative output side is low), the decision circuit 1015 would have received a 1 at the input voltage ($V_{IN}$). When a high (e.g., 1) is the output on the (+ plus) positive output side of the decision circuit 1015, the transistor 1505 is turned on (transistor 1510 off) and the current source 1130 provides a pulse of current $I_{DFE}$ that discharges the capacitance $C_{PD}$ of capacitor 1110 to remove the post-cursors (i.e., the tail) discussed herein. When the output on the (−) negative output side of decision circuit 1015 is high (and the positive output side is low), the decision circuit 1015 would have received a 0 at the input voltage ($V_{IN}$). When a high (e.g., 1) is the output on the negative output side of the decision circuit 1015, the transistor 1510 is turned on (transistor 1505 turned off) and the current source 1130 draws current from the dummy load resistor $R_D$ 1515.

Figure 16:
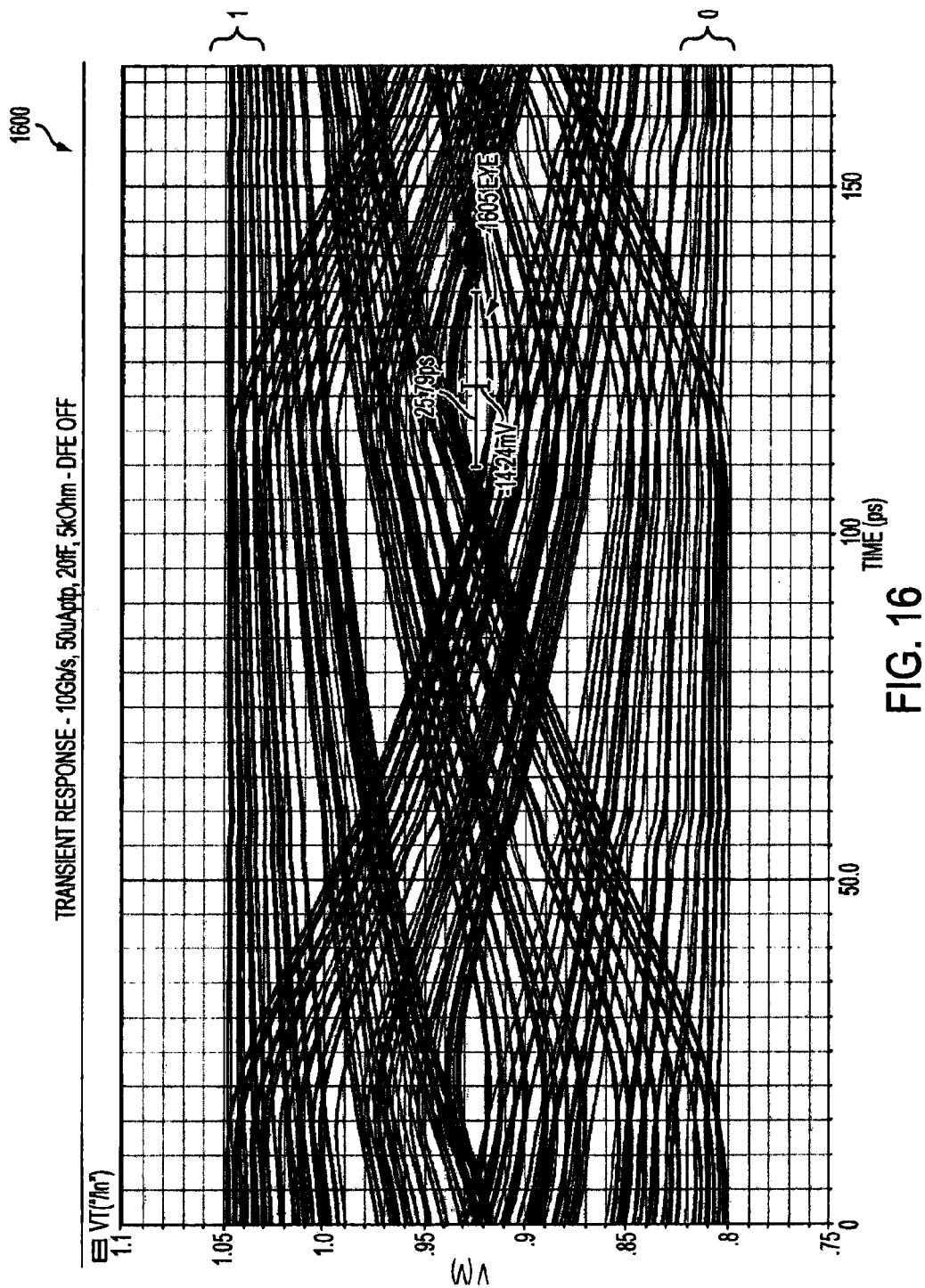
FIG. 16 is a graph of simulated input voltage at an input node of a decision circuit without a decision feedback equalizer.

FIG. 16 is a graph 1600 that shows simulated voltage $V_{IN}$ at the input node without DFE. The simulation results were run at a data rate of 10 Gb/s with the DFE off. Without the DFE, almost no eye opening 1605 is visible and the decision circuit 1015 is not able to determine 1s and 0s reliably from the digital data stream.

Figure 17:
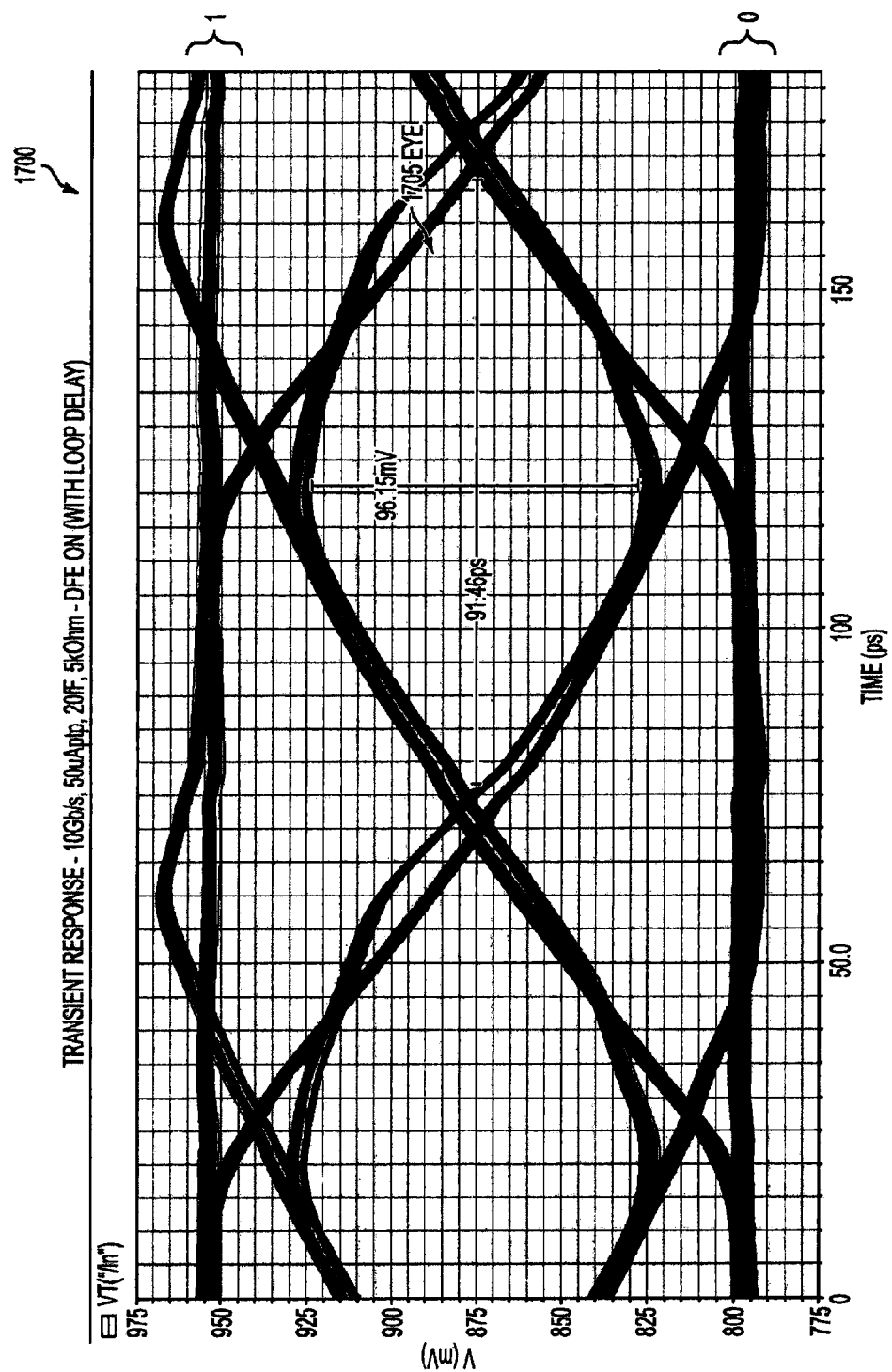
FIG. 17 is a graph of simulated input voltage at the input node of a decision circuit with a decision feedback equalizer according to an exemplary embodiment.

FIG. 17 is a graph 1700 that shows simulated voltage $V_{IN}$ at the input node of the decision circuit 1015 with DFE turned on according to an exemplary embodiment. The simulation results in graph 1700 were run at a data rate 10 Gb/s, with the DFE on and with time delay in the feedback loop (a realistic situation). With the DFE in place, the eye opening 1705 is clear and the decision circuit 1015 has no trouble determining 1s and 0s in the digital data stream according to an exemplary embodiment.

FIG. 17 reveals one drawback of the system of FIG. 13, namely the time delay inherent in the feedback loop. Because the feedback loop is not instantaneous, $I_{DFE}$ is not subtracted exactly 1 UI after the start of the input pulse $I_{IN}$. As a result, the H1 post-cursor is not fully canceled and the vertical eye opening 1705 is not maximized. That is, the eye opening 1705 does not reach all the way to the top rail at 1 and all the way to the bottom rail at 0.

Figure 18:
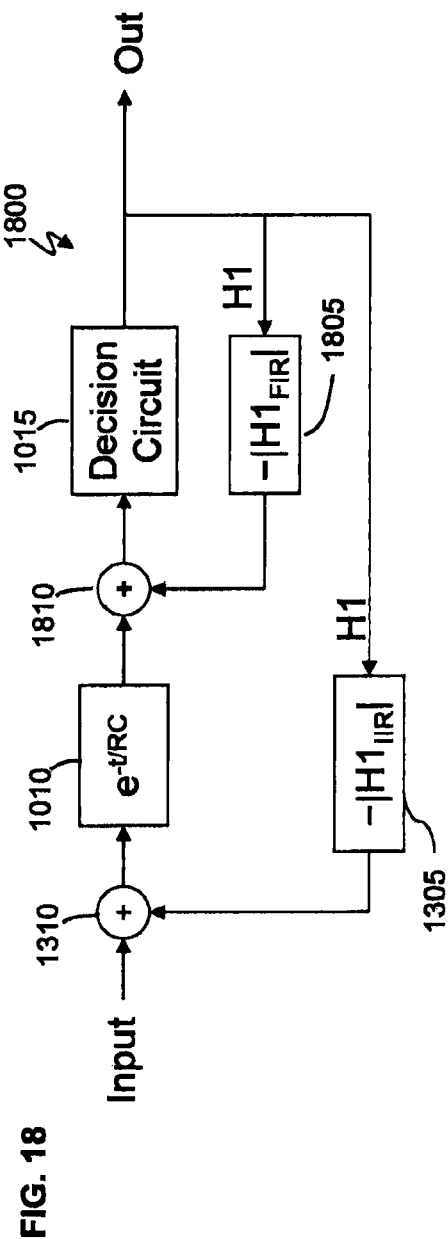
FIG. 18 is a system-level diagram of an optical receiver with a merged IIR filter and the RC front-end, while adding a separate finite impulse response (FIR) feedback path according to an exemplary embodiment.

To address the issue, a separate finite impulse response (FIR) feedback path can be added to the DFE to eliminate the residual H1 post-cursor. The resulting system-level diagram 1800 is shown in FIG. 18. FIG. 18 is a system-level diagram 1800 of an optical receiver merging feedback gain 1305 and the RC front-end 1010 (providing the IIR feedback path) and then adding a separate finite impulse response (FIR) feedback path (through the decision circuit 1015, feedback gain 1805, and summer 1810) to eliminate residual H1 post-cursor according to an exemplary embodiment. This relaxes the timing requirements on the IIR feedback path (through feedback gain 1305, summer 1310, RC front end 1010, summer 1810, and decision circuit 1015), allowing higher-speed operation while completely eliminating the H1 post-cursor.

Figure 19:
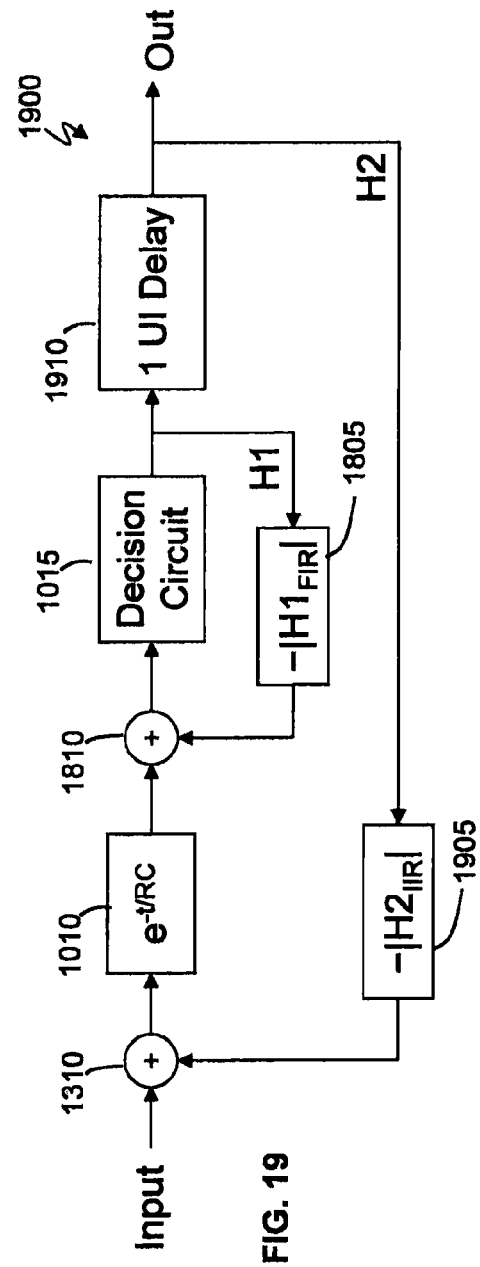
FIG. 19 is a system-level diagram of another implementation with a finite impulse response (FIR) feedback path according to an exemplary embodiment.

FIG. 19 is a system-level diagram 1900 that shows an alternate method that uses the FIR feedback path (through feedback gain 1805, summer 1810, and decision circuit 1015) to subtract H1, and uses the IIR feedback path (through feedback gain 1905, summer 1310, RC front end 1010, summer 1810, decision circuit 1015, and 1 UI delay 1910) to subtract H2 and later post-cursors according to an exemplary embodiment. FIG. 19 avoids timing dependence on the decision circuit 1015 in the IIR feedback path, by adding a 1 UI delay circuit 1910 into the IIR feedback path. As such, decoupling the decision circuit 1015 from the IIR feedback path is beneficial when attempting to maximize sensitivity. Decision circuits commonly use latches which make decisions by amplifying the input signal with regenerative amplification. Regenerative amplification trades time for amplification. Smaller signals require more time delay before a decision is made, making the decision circuit's delay dependent on the input signal strength. This delay may be a potential source of problems as the timing of signals through the IIR feedback path directly affect the eye opening. However, the FIR feedback path only requires that all signals arrive before the next decision is made.

The IIR feedback paths of FIGS. 18 and 19 are fed with full-rate, error-free data. However, the FIR paths can use half-rate data and employ speculation to further relax timing requirements, as described in S. Kasturia and J. H. Winters, "Techniques for High-Speed Implementation of Nonlinear Cancellation", IEEE J. Sel. Areas Commun., vol. 9, no. 5, pp. 711-717, June 1991, which is herein incorporated by reference.

The present disclosure is applicable to all optical receivers. It is particularly suited for applications in highly integrated silicon photonics designs, where system clock is already available and digital output is expected (as opposed to continuous time output in standalone optical receivers). Additionally, the high sensitivity of the proposed optical receiver, combined with low capacitance of the integrated photodiode can result in a very low power, compact, mostly digital solution that can operate at high data rates. The resulting savings in the system optical budget could also be very important since the optical power from a single continuous laser source can be split between a larger number of channels.

Figure 20:
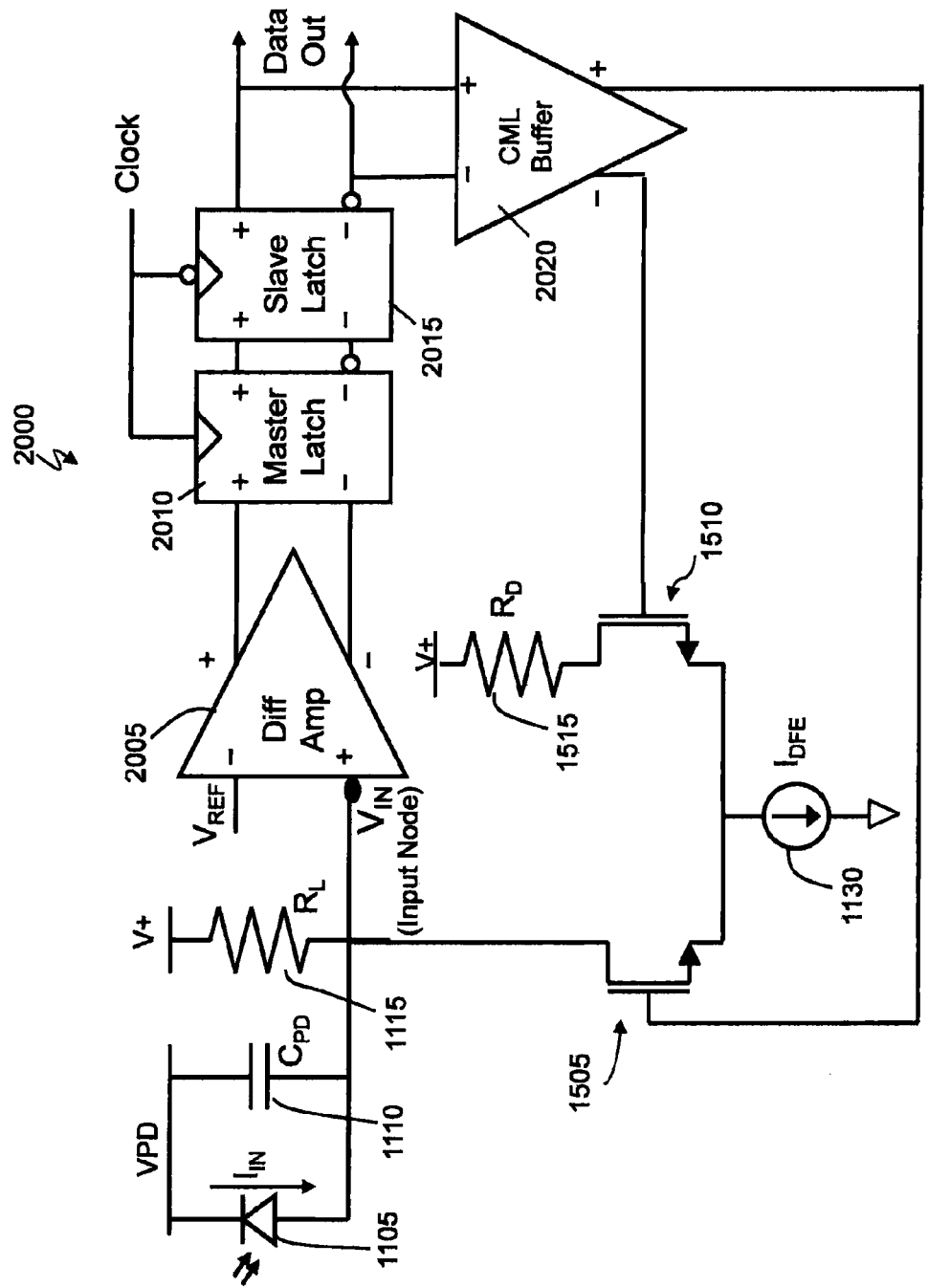
FIG. 20 is an implementation of a low-power full-rate optical receiver architecture according to an exemplary embodiment.

Similar to the optical receiver in FIG. 15, FIG. 20 is another (hardware) implementation of a low-power full-rate receiver architecture according to an exemplary embodiment. Instead of the decision circuit 1015 box in FIG. 15, the optical receiver 20 has a differential amplifier 2005, master latch 2010, slave latch 2015, and current mode logic (CML) buffer 2020 to turn on the transistor 1505 or turn on the transistor 1510. Voltage $V_{REF}$ is used as the decision threshold for the receiver. If the input voltage is above the decision threshold, the received data is a 1; otherwise, the received data is a 0. $V_{REF}$ may be adjusted as required by the optical receiver and is typically set halfway between the 0 level and the 1 level. Differential amplifier 2005 has two functions: first, to amplify the difference between the input node voltage $V_{IN}$ and the decision threshold voltage $V_{REF}$; second, to absorb noise created by clock switching inside master latch 2010 before that noise can affect the input node voltage. Master latch 2010 compares the amplified difference signal from differential amplifier 2005 when the clock signal goes high and determines if the differential signal is greater than 0 v (received a 1) or less than 0 v (received a 0). Slave latch 2015 passes the decision of master latch 2010 when clock is high and holds the decision while clock is low. CML buffer 2020 provides a buffer between slave latch 2015 and transistors 1505 and 1510 to prevent noise created by the clock in slave latch 2015 from reaching the transistors 1505 and 1510 and through them, to the input node. The resulting overall system function is the same as described for FIG. 15.

Exemplary embodiments are configured for large values of $R_L$ as compared to standard optical receiver front-ends (i.e., resistor capacitor). The typical bandwidth (BW) requirement for standard optical receiver front-ends is BW=0.7·data rate or recast in terms of $R_L$, $C_{PD}$, and UI, is $1/(2·\pi·R_L·C_{PD})=0.7·(1/UI)$.

The above equation can be reduced to an equation giving the value of $R_L$ for given values of $C_{PD}$ and UI: $R_L=0.23·UI/C_{PD}$. For the DFE-IIR based optical receiver, the optimal balance (in FIGS. 4, 5, and 6) between gain and ISI is around the 3 dBΩ location, which occurs at $R_L=1.23·UI/C_{PD}$. Thus, it can be seen that the DFE-IIR optical receiver (of exemplary embodiments) allows values of $R_L$ that are 5.3× (five point three times) greater than the standard optical receiver for the same values of $C_{PD}$ and UI.

Now, the main cursor gain will be compared. The equation for the main cursor gain is $V_{H0}=I_{IN}·R_L·(1-e^{-UI/R_L·C_{PD}})$.

Using the equation for the main cursor gain above, the values of $R_L$ can be plugged in for the standard receiver (e.g., in FIGS. 1 and 2) versus and the DFE-IIR receiver, and the respective main cursor gains can be calculated. For the standard receiver, the main cursor gain is given by Main Cursor Gain=0.23·UI/$C_{PD}$. However, for the DFE-IIR optical receiver (of exemplary embodiments), the main cursor gain is given by Main Cursor Gain=0.69·UI/$C_{PD}$. Thus, it can be seen that the DFE-IIR optical receiver achieves 3× (three times) the main cursor gain of the standard optical receiver for the same values of $C_{PD}$ and UI. Unlike standard optical receivers, exemplary embodiments purposely increase the gain by using a large value for the load resistor $R_L$ ($R_L=1.23·UI/C_{PD}$ as compared to $R_L=0.23·UI/C_{PD}$), which causes a large amount of intersymbol interference (ISI), but this ISI gets subtracted away as disclosed herein.

FIG. 21 illustrates a method 2100 for configuring an optical receiver according to an exemplary embodiment. Reference can be made to FIGS. 13, 14, 15, 18, 19, and 20. A photo detector 1105 is connected to a load resistor $R_L$ 1115 and generates a current $I_{IN}$, and the photo detector 1105 has an internal capacitance CPD (of capacitor 1110) at block 2105.

A current source ($I_{DFE}$) 1130 is connected through a switching circuit (e.g., switch 1135) to the load resistor $R_L$ 1115 and to the photo detector 1105 based on a previous data bit at block 2110. For example, the switching circuit is opened or closed based on the previous data bit.

The current source ($I_{DFE}$) 1130 is configured to discharge the current (i.e., charge on the capacitor 1110) on the internal capacitance $C_{PD}$ based on the switching circuit connecting the current source 1130 to the internal capacitance $C_{PD}$ at block 2115.

Further, a decision circuit 1015 provides the previous data bit. The switching circuit includes a first transistor 1505 and a second transistor 1510. The first transistor 1505 is configured with its drain connected to the load resistor $R_L$ 1115, the internal capacitance $C_{PD}$ (of capacitor 1110), and the photo detector 1105, its source connected to the current source 1130, and its gate configured to an output (+) of the decision circuit 1015. The second transistor 1510 is configured with its drain connected to a resistor (e.g., dummy resistor $R_D$ 1515), its source connected to the current source 1130, and its gate connected to the output (−) of the decision circuit 1015.

Additionally, responsive to the output (+) of the decision circuit 1015 turning on the first transistor 1505, the first transistor 1505 is configured to connect the current source 1130 to the input (e.g., input node for input voltage ($V_{IN}$)) of the decision circuit 1015 so that the current source 1130 removes post-cursors from the input. Responsive to the output (−) of the decision circuit 1015 turning on the second transistor 1510, the second transistor 1510 is configured to connect the current source 1130 to the dummy resistor.

The internal capacitance $C_{PD}$ and the load resistor $R_L$ 1115 create an exponential time constant ($e^{-t/RC}$) in the optical receiver. Based on this, the current source 1130 reuses the exponential time constant created by the internal capacitance and the load resistor to remove post-cursors from the input voltage $V_{IN}$ to the decision circuit 1015.

Also, a feedback gain 1805 is connected to an output and an input of the decision circuit 1015 in order to form a finite impulse response feedback loop. As such, the feedback gain 1805 is configured to eliminate a delay when removing the post-cursors by removing a first post-cursor H1 of the post-cursors (H1 through the last post-cursor), in order to maximize an eye opening 1705 in the input voltage $V_{IN}$ to the decision circuit 1015.

Further, the decision circuit 1015 includes and/or can be implemented with a differential amplifier 2005, a master latch 2010, and a slave latch 2015. The differential amplifier is connected to the master latch and the master latch is connected to the slave latch.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for an optical receiver, the method comprising:
generating a voltage by a photo detector connected to a load resistor, the photo detector comprising an internal capacitance;
making a decision by a decision circuit based on the voltage, the voltage being received at an input to the decision circuit;
generating by an infinite impulse response filter a filter output based on the decision from the decision circuit, in which the filter output of the infinite impulse response filter matches a decaying exponential tail of the voltage, wherein the infinite impulse filter comprises a switching circuit configured to connect to a current source, a capacitance matching the internal capacitance of the photo detector, and a resistance matching a load resistance of the load resistor; and
subtracting the filter output from the voltage at the input to the decision circuit to remove the decaying exponential tail of the voltage,
based on a previous data bit from the decision circuit causing the switching circuit to discharge the photo detector through the current source.

2. The method of claim 1, wherein the internal capacitance of the photo detector creates the decaying exponential tail of the voltage.

3. An optical receiver, comprising:
a photo detector connected to a load resistor configured to generate a voltage, the photo detector comprising an internal capacitance;
a decision circuit configured to make a decision based on the voltage, the voltage being received at an input to the decision circuit; and
an infinite impulse response filter configured to generate a filter output based on the decision from the decision circuit, in which the filter output of the infinite impulse response filter matches a decaying exponential tail of the voltage;
wherein the infinite impulse filter comprises a switching circuit configured to connect to a current source, a capacitance matching the internal capacitance of the photo detector, and a resistance matching a load resistance of the load resistor;
wherein the filter output is subtracted from the voltage at the input to the decision circuit to remove the decaying exponential tail of the voltages,
based on a previous data bit from the decision circuit causing the switching circuit to discharge the photo detector through the current source.

4. The optical receiver of claim 3, wherein the internal capacitance of the photo detector creates the decaying exponential tail of the voltage.

5. The method of claim 1, wherein the previous data bit from the decision circuit corresponds to a high output or a low output in order to determine when to subtract the filter output from the voltage.

* * * * *